Figure 7:
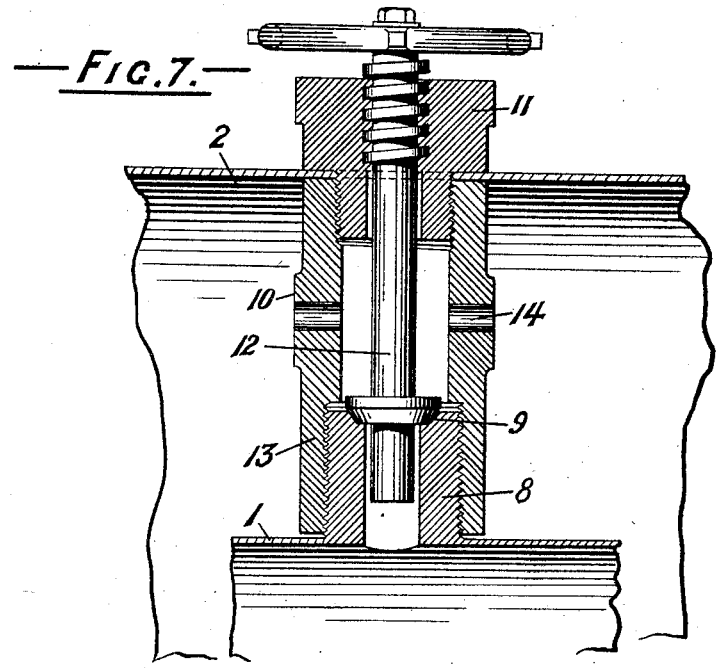

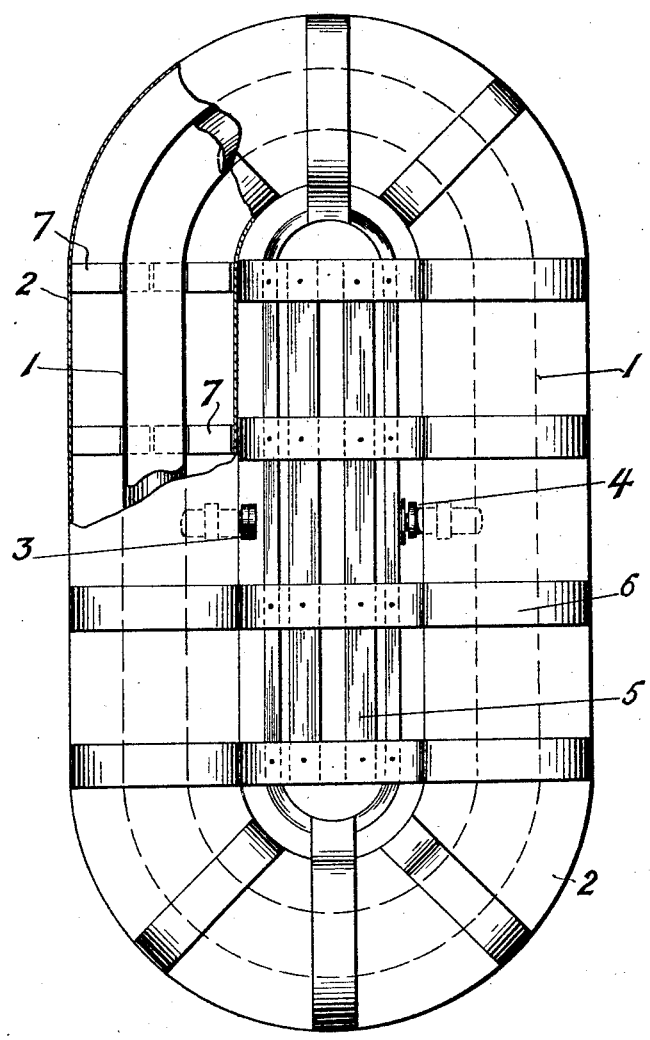

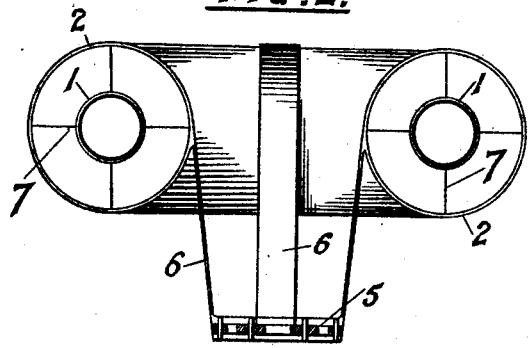
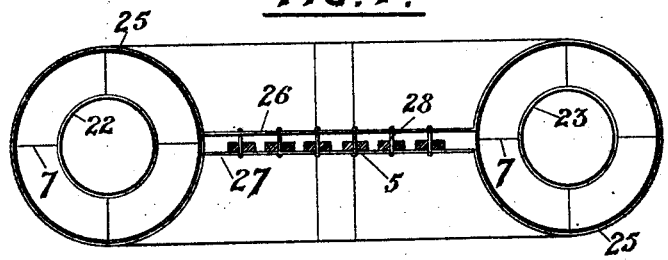
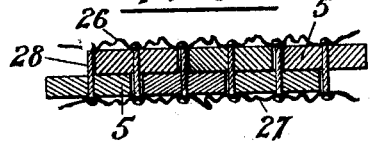

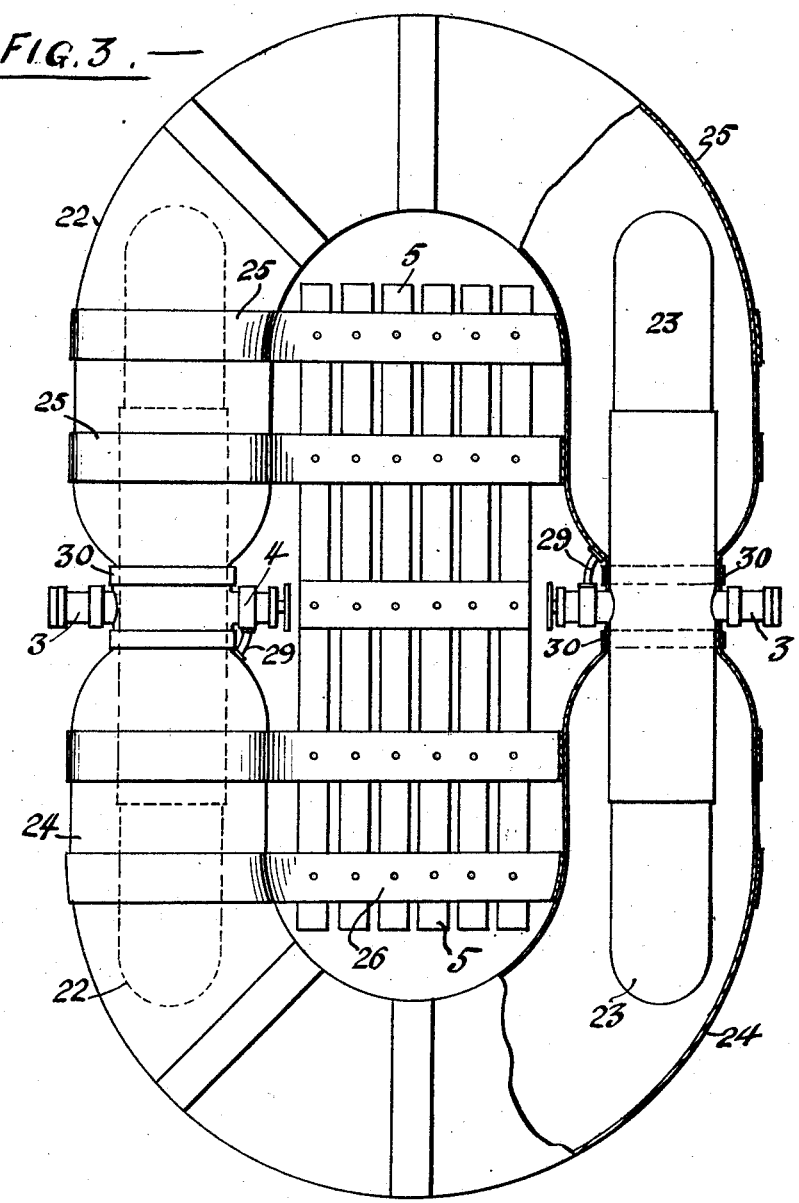

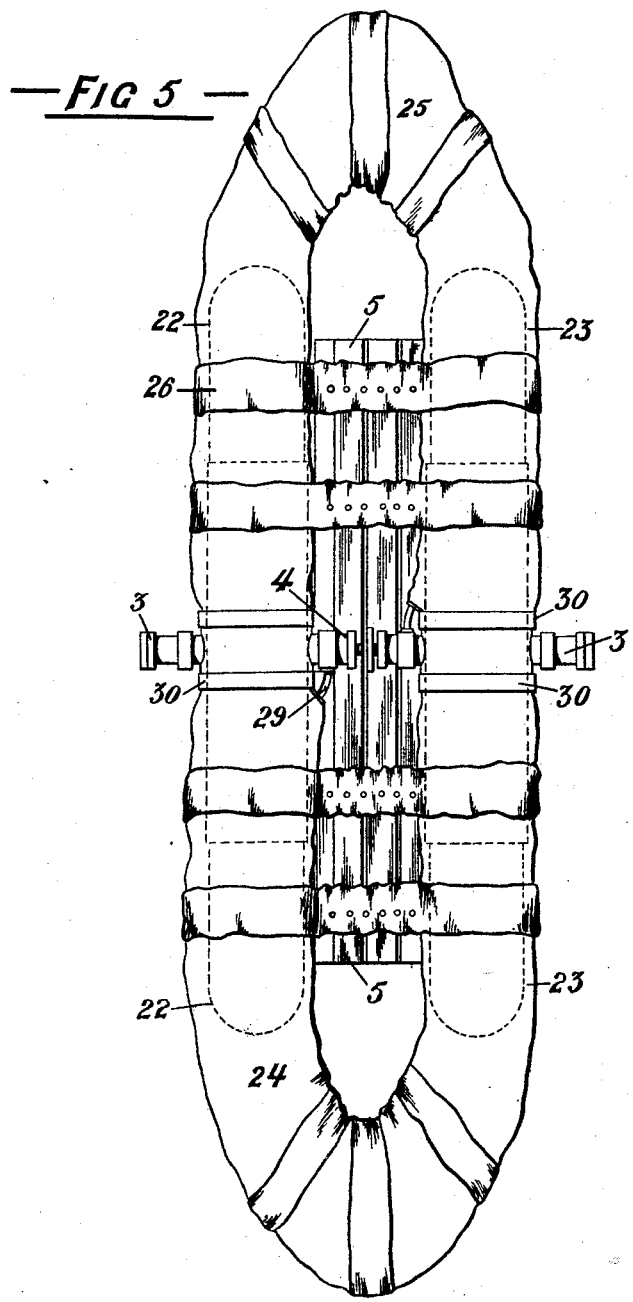

E. T. WILLOWS AND W. J. AUSTIN.
LIFE SAVING FLOAT.
APPLICATION FILED SEPT. 1, 1921.

1,410,438.

Patented Mar. 21, 1922.
5 SHEETS—SHEET 5.

UNITED STATES PATENT OFFICE.

ERNEST THOMPSON WILLOWS, OF LONDON, ENGLAND, AND WALTER JAMES AUSTIN, OF SWANSEA, WALES; SAID WILLOWS ASSIGNOR TO SAID AUSTIN.

LIFE-SAVING FLOAT.

1,410,438. Specification of Letters Patent. Patented Mar. 21, 1922.

Application filed September 1, 1921. Serial No. 497,571.

(GRANTED UNDER THE PROVISIONS OF THE ACT OF MARCH 3, 1921, 41 STAT. L., 1313.)

*To all whom it may concern:*

Be it known that we, ERNEST THOMPSON WILLOWS, residing at London, England, and WALTER JAMES AUSTIN, residing at Swansea, South Wales, Great Britain, both subjects of the King of Great Britain, have invented certain new and useful Improvements in Life-Saving Floats, (for which I have filed application in England May 21, 1919, Patent No. 142,672,) of which the following is a specification.

The present invention refers to improvements relating to that kind of life saving float of annular form having a centrally located platform connected to the float to support the user or users, and which platforms have been connected to such floats by flexible members of suitable length to permit the platform to be located at a lower level than the annular float; in this construction it is comparatively immaterial which side of the annular float is in contact with the water, and the person or persons using such a float stand or rest upon the platform aforesaid.

Now the object of the present invention is to effect improvements in floats of this character, whereby the weight and bulk can be greatly reduced, the buoyancy increased, and such floats rendered suitable not only for being carried on sea-going vessels, but also rendered suitable for being carried on aircraft.

According to this invention the float structure is annular, say circular or elliptical, and is composed of a flexible envelope of air and waterproof material, within which is located a metal tube adapted to contain air under pressure, the envelope being of such dimensions that when inflated with air it affords the requisite buoyancy; and secured to the structure and located within the central space of the annulus is a platform to support the person or persons using such life-saving float. A valve or valves is or are fitted to the metal tube, operable prior to the float being brought into use and by which the desired quantity of air within the metal tube can be permitted to pass therefrom into the flexible envelope to produce the inflation of the same, and whereby the air passage between the metal tube and the envelope can be closed when required; when the flexible envelope is thus inflated by the air permitted to pass thereinto from the metal tube, the float is ready for use. Means are provided, such as a charging valve, whereby the metal tube can be charged with air at the requisite pressure.

As a development of the invention the structure is made so that it can be contracted when not in use so as to occupy less space upon the ship, aircraft or other place upon which the appliance is to be carried, and whereby the said appliance can be quickly expanded when to be brought into use. In carrying out this development of the invention, two parallel metal tubes, each for containing pressure air, are provided, said metal tubes being closed at their ends, and the flexible envelope is then preferably constructed in two parts, each forming a complete chamber to receive pressure air, the ends of the metal tubes entering the ends of the flexible envelopes in an airtight manner, so that the envelopes as it were bridge the space between the ends of the metal tubes. Valves are fitted by which air can be charged at the requisite pressure into the metal tubes and retained therein, and valves are also fitted whereby, when the appliance is to be brought into use, air can be admitted from the metal tubes to the envelopes. The platform is preferably made contractible, so that when the appliance is not in use and the envelopes are deflated, the metal tubes can be moved adjacent each other and the envelopes folded, thereby considerably reducing the space occupied by the appliance when not in use.

In the accompanying drawings Figs. 1 and 2 show in plan view and cross section an example of construction of a life-saving float according to this invention.

Figure 8:
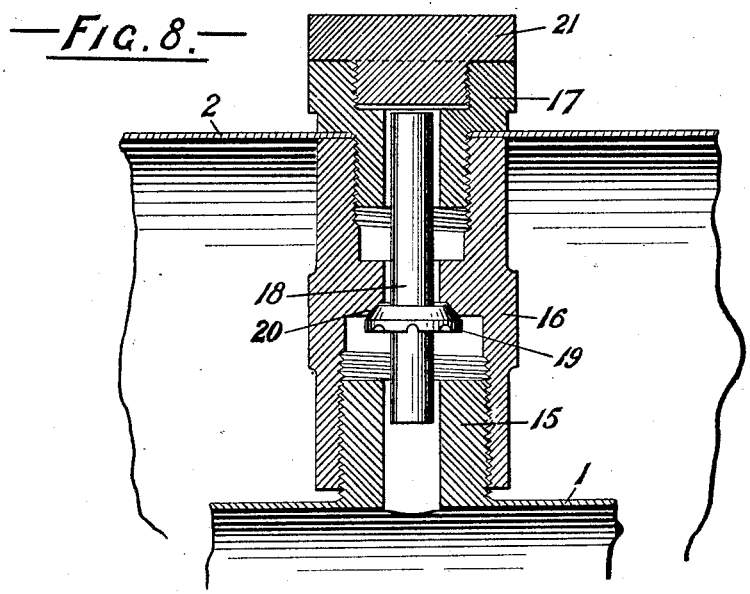

Figs. 3 and 4 are plan and cross sectional views of a development of this invention in which the float shown is collapsible, Fig. 5 is a plan view of the latter construction in its collapsed form, Fig. 6 a detail view showing the platform contracted to enable the float to be packed into small compass, Fig. 7 is a sectional view of an outlet valve and Fig. 8 is a similar view of a charging valve suitable for applying to floats constructed according to this invention.

Referring now to Figs. 1 and 2, an annular metal tube 1 is enclosed within an annular flexible envelope 2 which is constructed of airtight and waterproof fabric, the said envelope being of dimensions to afford the required buoyancy when inflated with air. So constructed the annular metal tube 1 is utilized to contain air under pressure and is furnished with a charging valve 3 and an outlet valve 4, these valves being fixed to the annular metal tube 1 and projecting through the flexible envelope 2.

A platform for carrying the persons using the float is constructed of lattice 5 supported by flexible bands 6 fixed to the envelope 2 and depending therefrom within and below the said envelope.

The annular tube 1 is held centrally within the flexible envelope 2 (when the latter is inflated) by webbing straps 7, see Figs. 2 and 4.

The valves 3 and 4 may be of any convenient construction and examples of such are shown at Figs. 7 and 8. The outlet valve 4 constructed as shown at Fig. 7 comprises an externally screw threaded tubular socket 8 fixed to the metal tube 1 and having a valve seat 9 formed in its upper end, a valve casing 10 screwed onto said socket and extending to the inner face of the flexible envelope 2, a cap 11 screwed into the said valve casing and so formed that the fabric of the envelope 2 is gripped between the cap 11 and the upper end of the valve casing 10, and a valve spindle 12 carrying at its lower end a valve with a conical face 13 adapted to seat itself upon the seat 9. At its upper end the valve spindle is screw-threaded to engage with a similar thread formed in the cap 11. In the walls of the casing 10, holes 14 are formed through which, when the valve is opened by turning the spindle 12, air under pressure will pass from the tube 1 to the interior of the envelope 2.

The charging valve 3 shown at Fig. 8 comprises an externally screw threaded tubular socket 15 fixed to the metal tube 1, a valve casing 16, a cap 17 screwed into the valve casing 16 and serving to grip the fabric of the envelope 2, a valve spindle 18 carrying a valve 19 which engages with a seat 20 formed in the valve casing 16, and a closing cover 21 screwed into the cap 17.

When the tube 1, is charged with compressed air the valve 19 will be held up onto its seat 20 thereby, and when there is no pressure in the said tube the valve will fall onto the upper end of the socket 15. When it is required to recharge the tube 1, the cap 21 is removed and air is pumped through the valve casing 16 and passes by means of channels in the underside of the valve 19 through the socket 15 into the tube 1. The cap 21 is then replaced and the envelope 2 in its deflated condition can be conveniently folded around the tube 1, and the structure secured by quick release straps or the like to aircraft or to the deck of a ship or any other place where required.

When the float is to be brought into use it is only necessary to release the appliance and operate the valve 4 Fig. 7 to allow the pressure air to pass from the annular tube 1 to the interior of the envelope 2, when the said envelope will become inflated and the appliance is immediately ready for use.

In many instances it is desirable that lifesaving floats of the character above described, when not in use, should occupy as little space as possible on the air-craft, ship or other place upon which the appliance is to be carried, and with this object in view, a construction is shown at Figs. 3, 4 and 5 of a life-saving float capable of being contracted when the flexible envelope is deflated.

In this construction, instead of the metal tube for containing compressed air being of annular formation, two separate metal tubes 22 and 23 are arranged parallel to each other and closed at their ends; the flexible envelope with such an arrangement is constructed conveniently in two parts 24, 25, each part forming a complete chamber to receive pressure air from the metal tubes 22 and 23, when the apparatus is to be brought into use, and in such construction the ends of the metal tubes 22 and 23 enter the ends of the flexible envelopes 24 and 25; in the form of construction now described one end of each metal tube 22 and 23 extends into the ends of one of the flexible envelopes 24, and similarly the other ends of the tubes 22 and 23 extend respectively into the ends of the other envelope 25, so that one envelope 24 bridges the space between the metal tubes 22 and 23, at one end and the other flexible envelopes 25 bridges the space between the metal tubes 22 and 23 at the other end. The flexible envelopes are connected in an airtight manner to the tubes at the parts where the tubes enter the envelopes.

In the central space enclosed by the envelopes 24 and 25 thus connected, a platform is fitted, and such platform is supported by bands 26, 27 surrounding and fixed to the exterior of the envelopes, and such band or bands connected therewith may extend across the central space aforesaid in, for instance, a plane which includes the axis of the parallel tubes 22 and 23.

This platform is constructed so as to be capable of being reduced in width when the appliance is to be folded, and to this end in the example illustrated, the platform is composed of laths 5.

These laths 5 are located between pairs of parallel bands 26, 27 extending from one envelope to the other, that is to say each pair of bands may be composed of a lower band and an upper band between which the laths 5 pass, and pins or position cords 28 may pass through the bands and through holes in the laths 5. With such a construction the platform may be contracted by moving one of the laths 5 up on its position cord and passing it partly above the next lath, so bringing the bands or webbing into folds and so contracting the width of the platform as shown in Fig. 6, or if preferred the laths 5 may be turned on the axis, to bring their faces vertical and approached to each other, and in either arrangement the expansion of the flexible envelopes 24 and 25 will expand the platform and draw the laths 5 back to their normal positions.

Charging and outlet valves 3 and 4 are fitted to each of the metal tubes 22 and 23 at or about centrally of their length between the adjacent ends of the envelopes 24 and 25. Each outlet valve 4 is connected to one of the envelopes by a tube 29 for inflating the said envelope by operating the valve 4 to allow the escape of the compressed air contained in the metal tubes.

With such a construction, when the envelopes 24 and 25 are deflated the platform can be contracted in width and the metal tubes 22 and 23 approached together, and when so contracted the appliance presents very considerable advantages as regards economy of space which is an important consideration in the utilization of such appliances, and moreover when the appliance is to be used it is only necessary to release it from its fixture, distance one of the tubes from the other, and operate the valves to cause the inflation of the flexible envelopes, and the apparatus is ready for use.

In connecting the ends of the flexible envelopes to the metal tubes which are to contain the pressure air, the ends of the flexible envelope into which the tube is inserted may overlie the ends of the other flexible envelope and both be secured one upon another around the walls of the metal tube by external bands 30 or the like.

What we claim as our invention and desire to secure by Letters Patent is:—

1. In life-saving floats of annular form and having a centrally located platform connected to said float to support the users; a float structure comprising a closed flexible envelope of air and waterproof material and of such dimensions that when inflated it affords the requisite buoyancy, a closed metal tube located within said envelope and adapted to contain air under pressure, a valve fitted to said metal tube to permit air to pass from within said tube into said flexible envelope to produce inflation of same or to close said air passage between said tube and said envelope when required, means for operating said valve from the exterior of said envelope, and a charging valve fitted to said tube and extending to the exterior of said envelope by which said tube can be charged with air at the requisite pressure.

2. In life-saving floats of annular form and having a centrally located platform connected to said float to support the users; a float structure comprising a closed flexible envelope of air and waterproof material and of such dimensions that when inflated it affords the requisite buoyancy, a metal tube located within said envelope and adapted to contain air under pressure, means for supporting said tube centrally within the said envelope when the latter is inflated, a valve fitted to said metal tube to permit air to pass from within the said tube into said flexible envelope to produce inflation of same or to close said air passage between said tube and said envelope when required, means for operating said valve from the exterior of said envelope, and a charging valve fitted to said tube and extending to the exterior of said envelope by which said tube can be charged with air at the requisite pressure.

3. In life-saving floats of annular form and having a centrally located platform connected to said float to support the users; a float structure comprising a closed annular substantially elliptical flexible envelope of air and waterproof material and of dimensions when inflated to afford the requisite buoyancy, two metal tubes having closed ends adapted to contain air under pressure, located within said envelope substantially parallel with and opposite to each other to permit said structure to be contracted by moving said metal tubes adjacent each other when said envelope is deflated, a valve fitted to each metal tube to control the passage of air from within said tubes to said flexible envelope to produce inflation of same, means for operating said valves from the exterior of said envelope, and a charging valve fitted to each of said tubes by which said tubes can be charged with air at the requisite pressure.

4. In life-saving floats of annular form and having a centrally located platform connected to said float to support the users; a float structure comprising two flexible tubular closed envelopes of air and waterproof material and of dimensions when inflated to afford the requisite buoyancy, two metal tubes having closed ends adapted to contain air under pressure one of said tubes entering adjacent ends of said two envelopes and the other tube entering the opposite adjacent ends of said two envelopes, means for securing said ends of said envelopes around said tubes in an airtight manner, a valve fitted to an exposed portion of each metal tube between said adjacent ends of said flexible envelopes to permit air to pass from said tubes to said flexible envelopes to produce inflation of same, means for operating said valves, and a charging valve fitted to each tube adjacent said exit valves by which said tubes can be charged with air at requisite pressure.

5. In life-saving floats of annular form; a float structure comprising a closed annular substantially elliptical flexible envelope of air and waterproof material, two metal tubes having closed ends adapted to contain air under pressure located within said envelope substantially parallel with and opposite to each other to permit said structure to be contracted by moving said metal tubes adjacent each other when said envelope is deflated, valves fitted to each metal tube to control the passage of air from said tubes to said envelope and to permit said tubes to be charged with air at requisite pressure, a contractible and expansible platform to support the users, and means for connecting said platform centrally to said flexible envelope.

In witness whereof we have hereunto set our hands in the presence of two witnesses.

ERNEST THOMPSON WILLOWS.

Witnesses:
 THOMAS WILLIAM ROGERS,
 LILIAN BERTHA RAPSON.

WALTER JAMES AUSTIN.

Witnesses:
 CYRIL STANLEY WANDLEY,
 WILLIAM SYLVANUS GURLLIARY.